United States Patent [19]
Buchelli

[11] Patent Number: 5,065,336
[45] Date of Patent: Nov. 12, 1991

[54] ON-LINE DETERMINATION OF POLYMER PROPERTIES IN A CONTINUOUS POLYMERIZATION REACTOR

[75] Inventor: Alberto Buchelli, Richmond, Va.

[73] Assignee: E. I. Du Pont de Nemours and Company, Wilmington, Del.

[21] Appl. No.: 353,690

[22] Filed: May 18, 1989

[51] Int. Cl.$^5$ .............................................. G06F 15/46
[52] U.S. Cl. ..................................... 364/499; 364/500
[58] Field of Search ................ 364/500, 496, 497, 498, 364/499

[56] References Cited

U.S. PATENT DOCUMENTS 4,775,943 10/1988 Chamberlin et al. ................ 364/497
4,825,380 4/1989 Hobbs .................................. 364/499

OTHER PUBLICATIONS

"The Structure of Polymers", M. L. Miller, Reinhold Publishing, N.Y., 1966, Polymer Science and Engineering Series (pp. 5-13).

*Primary Examiner*—Parshotam S. Lall
*Assistant Examiner*—S. A. Melnick

[57] ABSTRACT

The molecular weights (Mw and Mn) and polydispersity (Mw/Mn) of a polymer have significant impact on the final product properties and processability of materials made out of it. This invention provides a method for on-line prediction of polymer properties. In a continuous polymerization reactor in which an irreversible polymerization reaction occurs, sensors provide axial temperature and pressure profile in the reactor as well as monomer flow rates and concentration for determining Mw, Mn and polydispersity. Based on a non-Newtonian fluid mechanics analysis, differential influx analysis of a side stream incorporation and determination of the moments of the molecular weight distribution via a Newton-Raphson algorithm, the model calculates an axial polymer properties profile.

On-line real time "analytical measurement" of polymer properties is used to alert the operator of unusual reactor problems, to optimize reactor operation during shutdown and start-up or rate changes. This allows correlation of polymer properties to product performance in downstream processes.

2 Claims, 13 Drawing Sheets

ON-LINE DETERMINATION OF POLYMER PROPERTIES IN A CONTINUOUS POLYMERIZATION REACTOR

BACKGROUND OF THE INVENTION

A major problem constantly faced by engineers in the polymer reaction engineering field is to accurately predict the performance of continuous polymerization reactors. Due to the critical commercial application of polymers, the polymerization reaction should be very carefully controlled in order to insure uniform properties. However, most commercial installations lack proper on-line techniques to predict the product behavior as it is made in the reactor. A number of parameters such as hold-up time, pressure and temperature profile in the reactor are key factors affecting reactor and product performance. Also, product properties are affected by reactor start-up, shut-down and rate changes. There is indeed the need for a quick, continuous on-line measurement of polymer properties. As an on-line analyzer of polymer properties has not been demonstrated, the approach of using computational fluid dynamics techniques, elementary measurement of temperature, pressure and flow by means of in-line instruments and computer hardware (DCS, VAX 8000) have proven successful. Off-line verification of model predictions by means of a Liquid Chromatograph is then easily done.

This invention provides on-line real time polymer product properties as the polymer is being made in the reactor without making use of the chemistry of the reacting system. In fact, to follow the kinetics of the reaction for making polymer properties prediction has proven to be an approach without recognizable value, mostly for the reason that energies of activation and reaction rate constants for the reaction system are hard to measure accurately and, therefore, the numerical solution of the set of differential equations is inaccurate. Also, the polymerization chemistry might not be well understood, in particular, the kinetics of cyclic dimer and oligomer formation.

The present invention deals with the application of fundamental principles of fluid mechanics and polymer processing that were used in the on-line prediction of molecular weight average (Mw), molecular weight number average (Mn) and polydispersity (Mw/Mn) in a continuous tubular polymerization reactor.

SUMMARY OF THE INVENTION

The main objective of the present invention is to provide a method for monitoring and controlling the molecular weight build-up of a polymer inside a continuous polymerization reactor. The number average and weight average molecular weights are predicted on-line from fluid dynamic principles and a slow influx analysis of multiple side streams incorporation into the main bulk of the fluid flow. Process sensors placed along the length of the reactor provide continuous on-line measurement of the input variables required to perform the model calculations.

In a given reaction section, information regarding the average temperature, pressure drop per unit of length, fluid shear rate and residence time are coupled with the mixing times required to obtain a given side stream incorporation to determine polymerization solution viscosities. The solvent viscosity and solution viscosity determine a specific viscosity that in conjunction with information on polymer fraction in solution, solution density and polymer concentration are used to determine the polymer solution "intrinsic viscosity". In this step in the solution, a Newton-Raphson convergence algorithm is required. The molecular weight Mw of the polymer in the particular reactor section is obtained from the value of intrinsic viscosity via the Mark-Houwik equation.

The determination of the molecular weight number average Mn can proceed by first calculating an external stoichiometric ratio from values of the monomer's flow rates. Subsequently, the first and second moments of the molecular weights of the individual monomers are obtained. Then, a guess on the apparent stoichiometric ratio is made on the basis of the external stoichiometric ratio. Next, the calculation of the first and second moments of the molecular weight distribution of the polymer can proceed from knowledge of the apparent stoichiometric ratio and the first and second moments of the individual monomers. At this point, the molecular weight weight average Mw is calculated as the ratio of the second moment to the first moment of the molecular weight distribution of the polymer. If the value of Mw calculated in this fashion is the same as the value of Mw calculated in the paragraph above, then the solution has converged and we have at hand the right numerical values of the moments of the molecular weight distribution of the polymer. Therefore, the value of molecular weight number average Mn is obtained from the first moment of the molecular weight distribution of the polymer and the apparent stoichiometric ratio. In the event that convergence was not achieved, a Newton-Raphson solution guesses a "new value" of the apparent stoichiometric ratio and repeats the logic explained in this paragraph until convergence is achieved.

The determination of the polydispersity of the polymer can proceed in a straightforward fashion by using the converged values of the first and second moments of the molecular weight distribution of the polymer. The polydispersity of the polymer in a given section of the reactor is equal to the ratio of the second moment of the molecular weight distribution to the square of the first moment of the molecular weight distribution.

The present invention provides real time information on the reactor performance and makes it possible to implement a closed loop control of molecular weight number average Mn and polydispersity. Since the reactor control via an on-line viscometer provides means only to somewhat control molecular weight weight average Mw (see FIG. 4), the approach developed in this invention would without a doubt provide means for improved control of a continuous polymerization reactor. In fact, viscosity might not be a suitable control variable. In certain systems, viscosity may remain essentially unchanged while the molecular weight number average Mn varies out of control (see FIG. 5). This invention becomes an on-line real time "analytical measurement" tool of polymer characteristics. In fact, off-line laboratory analysis of polymer solution samples taken along sample ports in the reactor will take too long (more than 24 hours) versus on-line prediction. The model can make predictions as frequently as desired (as low as every 5 seconds) in as many reactor sections as appropriate input data is available. This invention allows the on-line monitoring of product quality in the continuous reactor while avoiding time-consuming laboratory analysis. The calculated results can then be used to alert the operator of unusual reactor problems, to optimize reactor operation during shutdown, and start-up or rate changes. Since all of the calculated results are stored in the data acquisition system, this invention allows the future correlation of product performance in downstream processes to the polymer characteristics.

DETAILED DESCRIPTION OF THE PREFERRED EMBODIMENT

The following contains a thorough description of the invention with regards to the on-line prediction and control of the polymer characteristics in a continuous polymerization reactor in which an irreversible polymerization reaction occurs.

Figure 1:
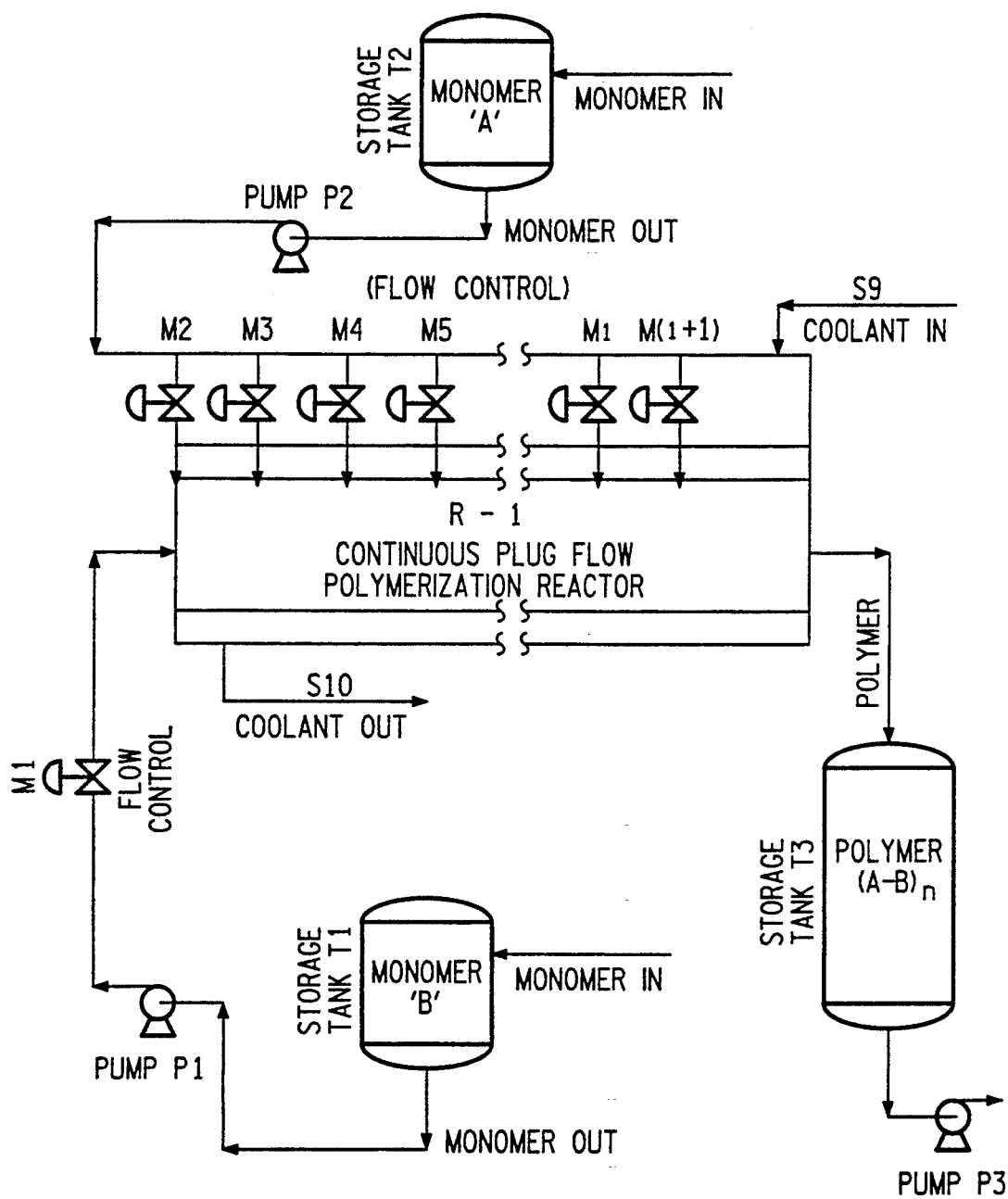
FIG. 1 shows a flowsheet of the continuous multipass polymerization reactor system.

FIG. 1 depicts the flowsheet regarding the present invention. A monomer "B" dissolved in a solvent contained in storage tank T1 is pumped by means of a pump P1 through a flow-metering system M1 into the inlet port of a continuous polymerization reactor R1. At the same time, pure monomer "A" contained in storage tank T2 is pumped by means of pump P2 through a series of flowmetering systems "mi" that are located at different axial locations in the reactor. The individual flowmetering systems "mi" allows the addition of varying amounts of monomer "A" into the reactor to optimize temperature profile and facilitate thermal management of the exothermic or endothermic reactions. As monomer "B" flows inside the reactor, it reacts with sidestreams that inject monomer "A". The over-all scheme of the polymerization can be represented by:

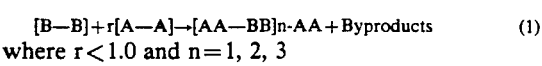

$$[B-B] + r[A-A] \rightarrow [AA-BB]n-AA + \text{Byproducts} \quad (1)$$

where $r < 1.0$ and $n = 1, 2, 3$ $r[=]$ overall stoichiometric ratio.

At the exit of the continuous polymerization reactor, the polymer and byproducts are stored in storage tank T3 and pump when necessary for further chemical processing using pump P3. A coolant stream S9 is fed to the reactor and exits at S10 for coolant or heating purposes in either a cocurrent or countercurrent fashion. The flowrates of monomers and coolant are controlled appropriately by means of flowmeters to provide desired stoichiometric ratios or to control the reactor within a given temperature profile.

Figure 1A:
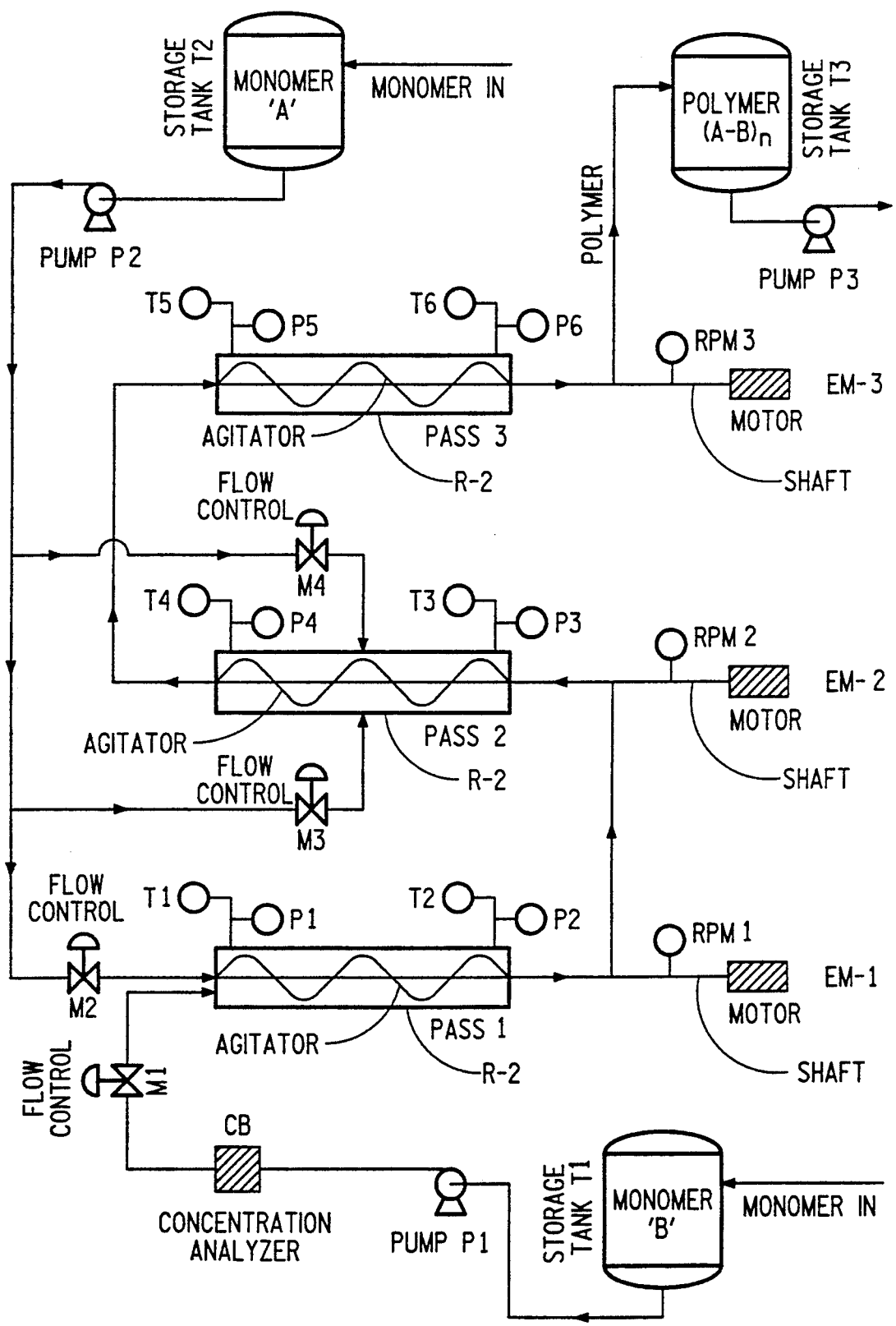
FIG. 1A is similar to FIG. 1 showing a flow sheet of a three pass reactor system.

FIG. 1A illustrates schematically a three pass reactor R2 utilizing the same general flow system as described above. The coolant flow has been deleted. The invention may be operable without a cooling jacket depending on the polymer. The pressure and temperature sensors designated T1-T6 and P1-P6, respectively, are shown at the inlet and outlet ends of each reactor pass, i.e. pass 1, pass 2 and pass 3. The analyzer CB-1 for monomer B concentration is located near the outlet end of pump P1. The tachometer sensors RPM-1, RPM-2 and RPM-3 are associated with motors EM-1, EM-2 and EM-3, respectively. The motors drive the agitators positioned in the respective passes of the reactor.

A list of instrumentation used is presented in the following Table 1. All of the sensors, flow metering devices, control valves and concentration analyzers are commercially available items and are used at locations indicated in FIGS. 1 and 1A.

TABLE 1

| TYPICAL LIST OF INSTRUMENTATION USED | | |
|---|---|---|
| ITEM | MODEL | COMMERCIAL IDENTIFICATION |
| SENSORS | | |
| RTD Sensors (T1, T2, T3, T4, T5, T6) | RTD-18-HT-9-OT-1 Sheath Material Tantalum | Thermo Electric Saddlebrook, NJ |
| Pressure Sensors P1, P2, P3, P4, P5, P6) | YSTG140E1600000- MBFIC3 | Honeywell Fort Washington, PA |
| Tach Sensors (RPM1, RPM2, RPM3) | Part No. ARCJ- 2A-001A and MP-37CA | Red Lion Controls Willow Springs Circle York, PA |
| Conc. Analyzer Monomer B In Solvent CB | Model 1801 | E. I. du Pont de Nemours and Company Wilmington, DE |
| FLOW CONTROL | | |
| Turbine Meters | | |
| Monomer B M1 | FT-6-16-CX50- LJC | Flow Technology, Inc. Phoenix, AZ |
| Monomer A M2 | FT-6-8CX5-LJC | Flow Technology, Inc. Phoenix, AZ |
| Monomer A M3 | FT0-CX10-LJC | Flow Technology, Inc. Phoenix, AZ |
| Monomer A M4 | FT0-CX6-LJC | Flow Technology, Inc. Phoenix, AZ |
| Control Valves | | |
| Monomer B M1 | 1456-2 Size 1" Trim, 3/18" Lin | Kieley & Mueller Middletown, NY |

TABLE 1-continued

| | TYPICAL LIST OF INSTRUMENTATION USED | |
|---|---|---|
| ITEM | MODEL | COMMERCIAL IDENTIFICATION |
| Monomer A M2 | 785-73B Size ¼" Trim P | Badger Meter, Inc. Research Control Valves Tulsa, OK |
| Monomer A M3 | 785-73B Size ¼" Trim I | |
| Monomer A M4 | 785-73B Size ¼" Trim K | Badger Meter, Inc. Research Control Valves Tulsa, OK |

Figure 2:
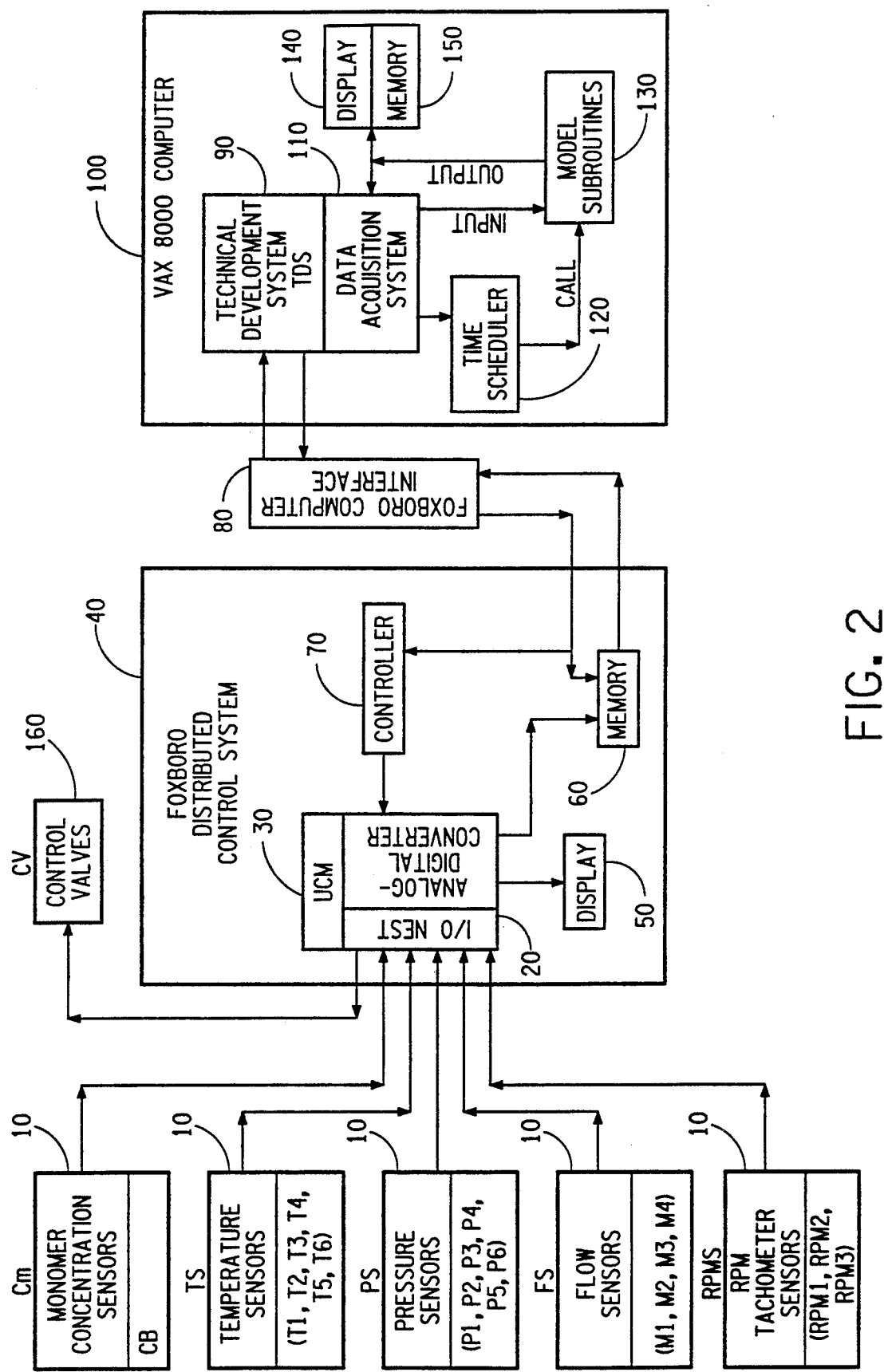
FIG. 2 shows a block diagram of the computer hardware and logical process information flow.
Figure 3A:
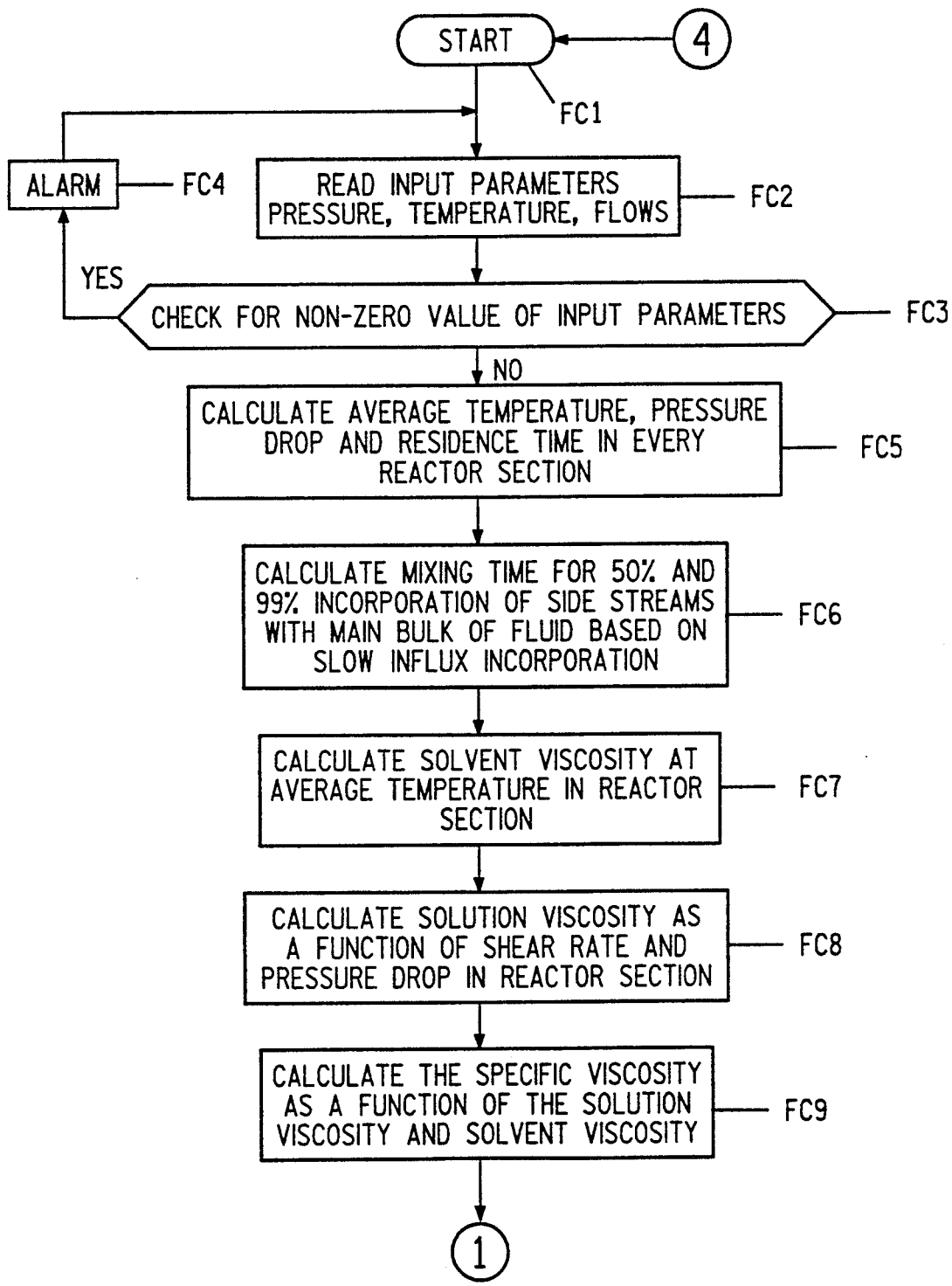
FIG. 3 shows the flowchart explaining the logical software calculation steps.
Figure 3B:
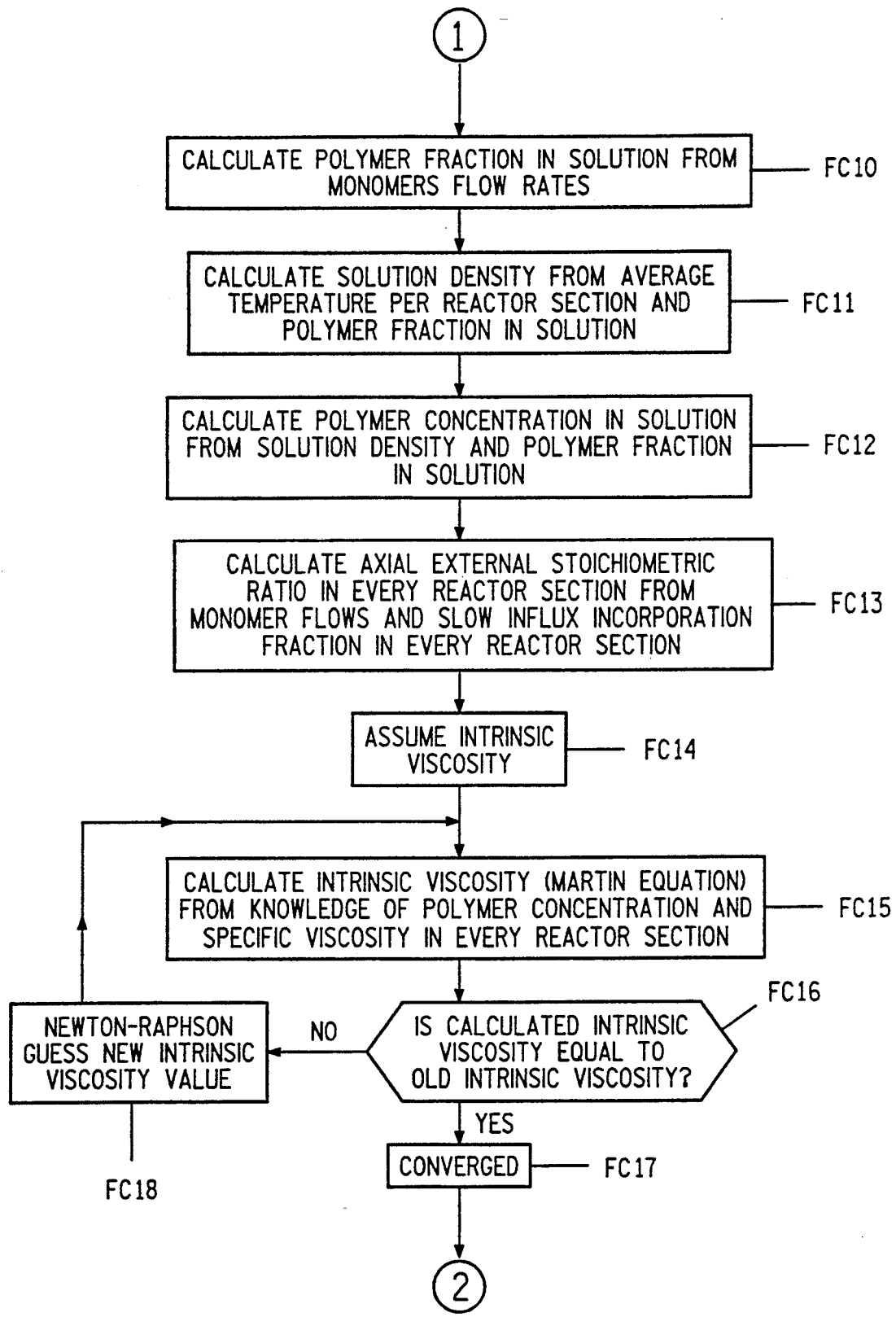
Figure 3C:
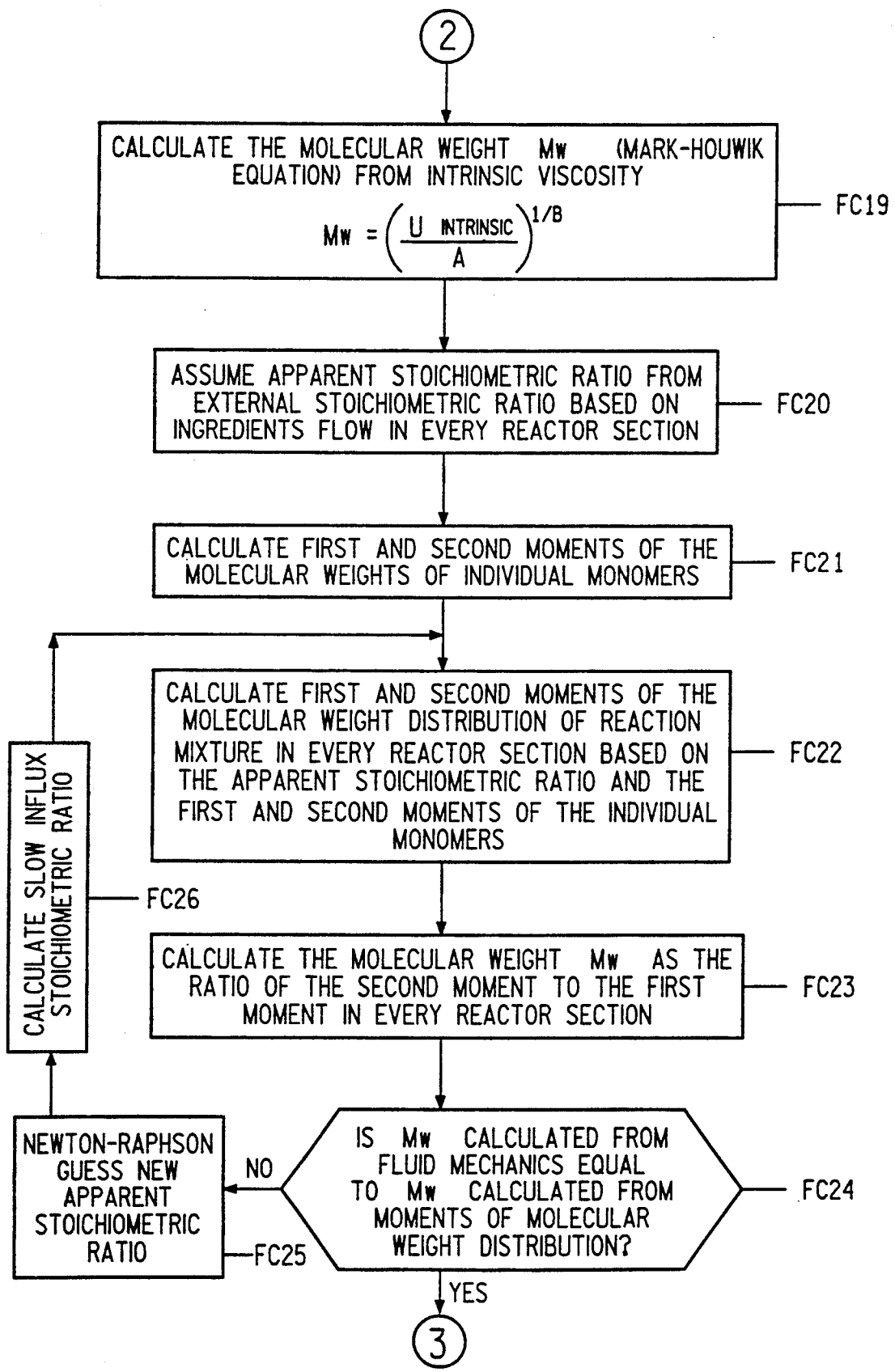
Figure 3D:
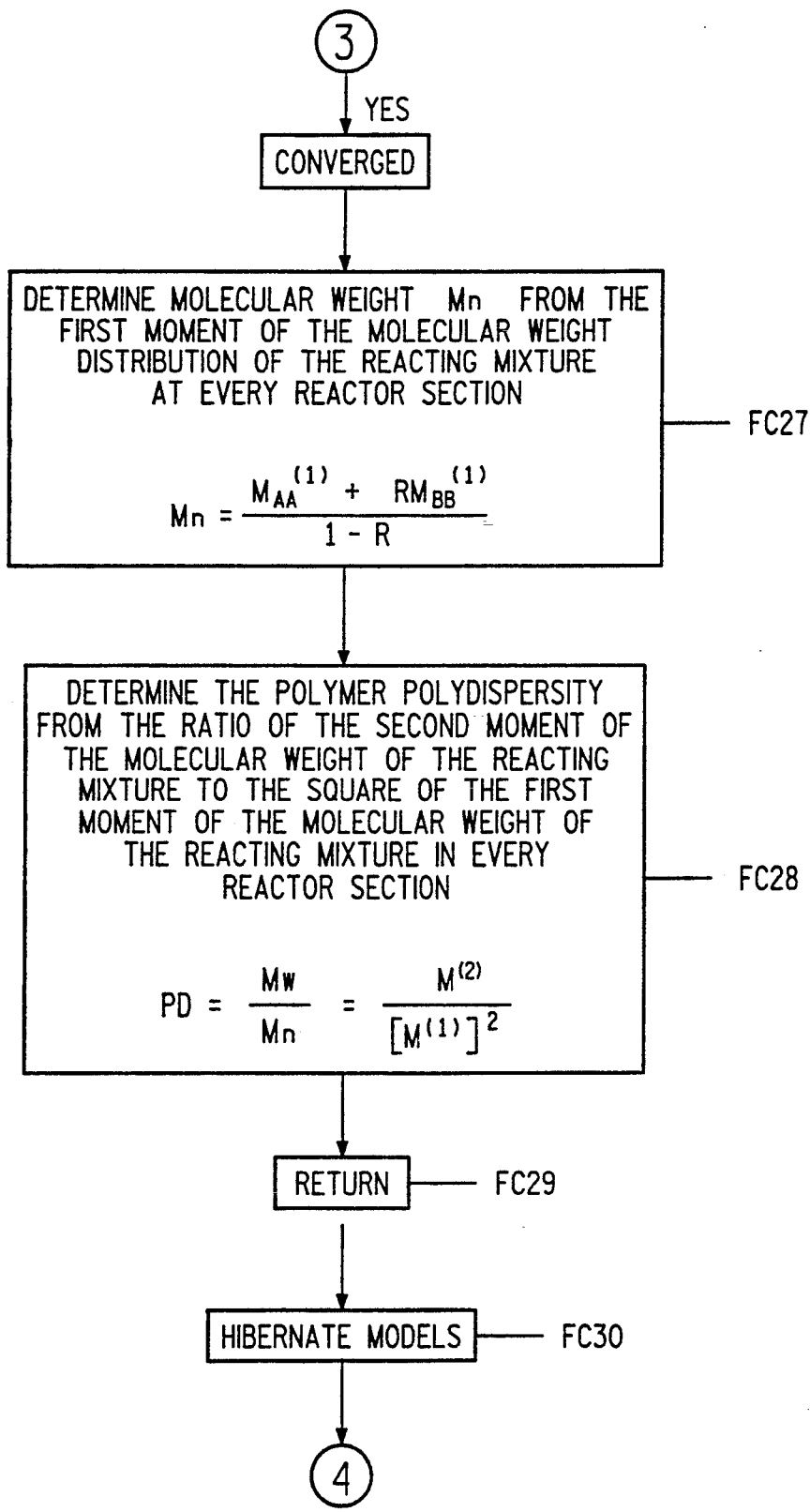
Figure 4:
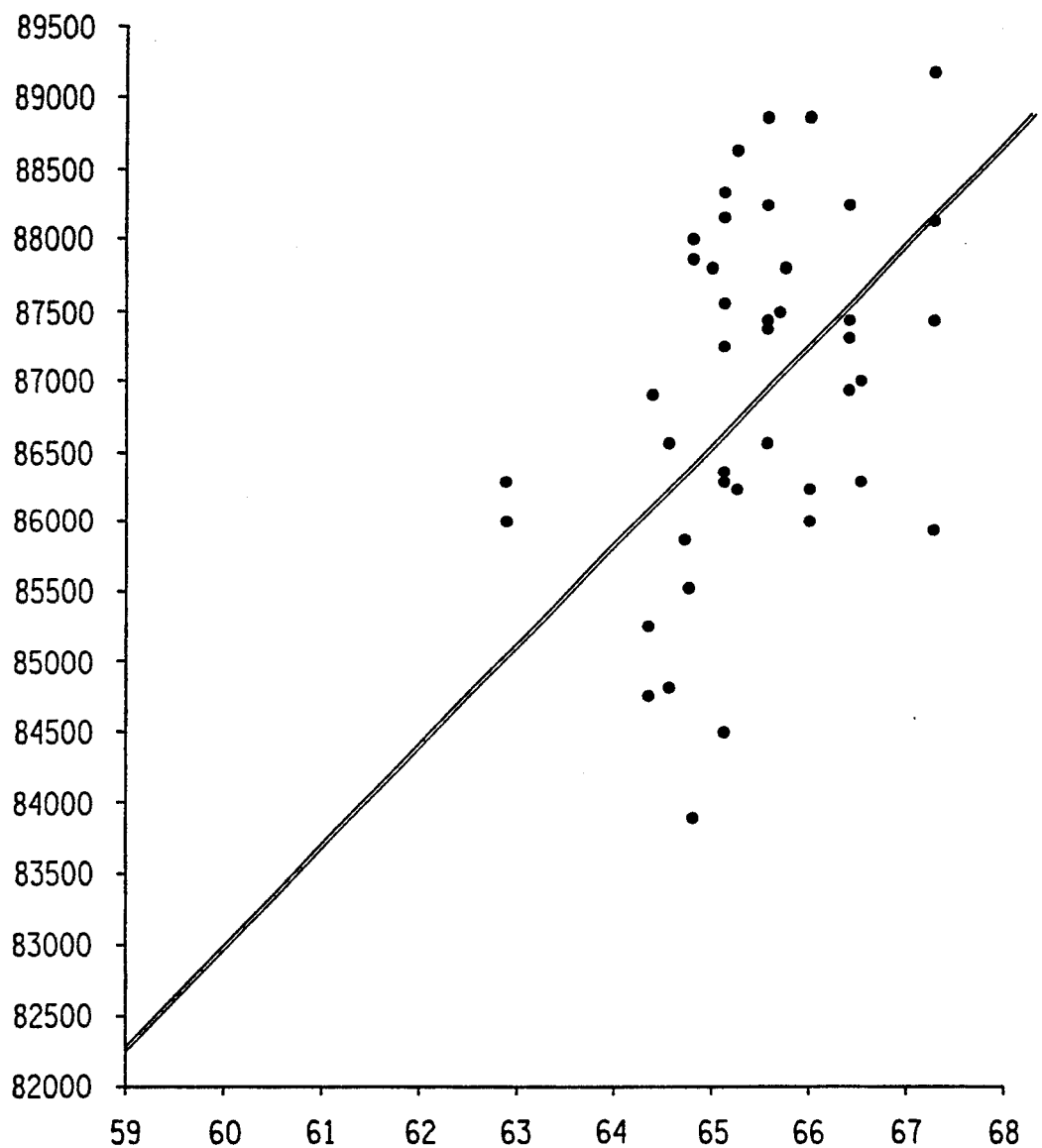
FIG. 4 shows typical experimental values of on-line control viscometer versus molecular weight weight average Mw.
Figure 5:
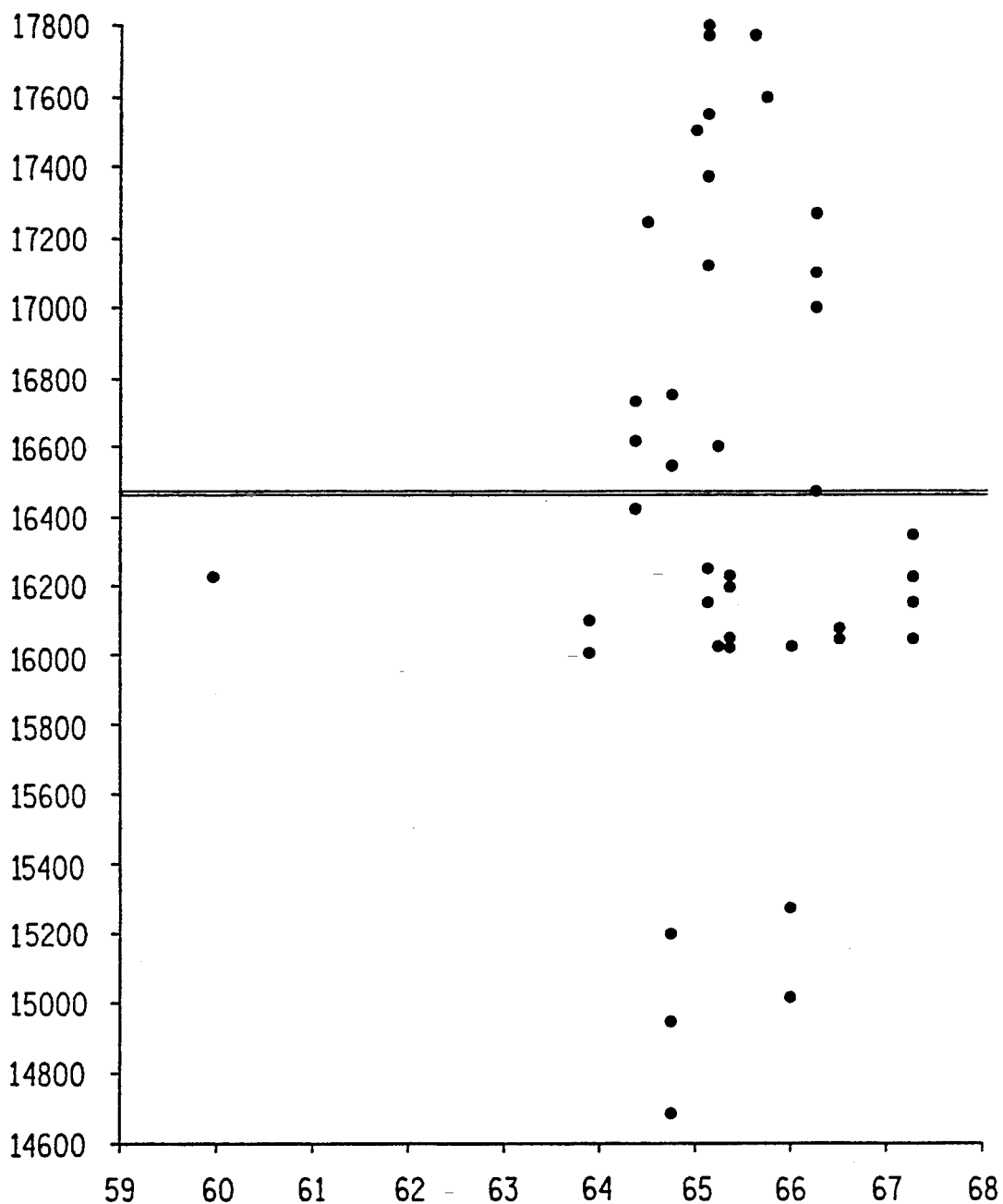
FIG. 5 shows typical experimental values of on-line control viscometer versus molecular weight number average Mn.

FIG. 2 shows the block diagram of the computer hardware and logical process information flow. Each process sensor 10 (Temperature TS, Pressure PS, Flow FS, Tachometer RPMS and Monomer Concentration CM) is connected to an analog to digital converter card 20 in the input/output (I/0) nest of the unit control module 30 (UCM) of the distributed control system 40 (DCS). When this hook-up is done and the cards are properly calibrated, the UCM must be configured to read the digital values 20 into its memory 60 and convert them to the desired range for calculation and display 50 at the DCS video spec operator's console. The live process input data required by the model must next be transferred to the VAX 8000 computer 100. This is done by the Foxboro computer interface 80 (FCI) which communicates with the technical development system 90 TDS. A VAX procedure runs the model subroutines 130 at a specified frequency set-up by the time scheduler 120. The time scheduler also hibernates the model subroutines. The input data required by the model subroutines is provided by the Data Acquisition System 110. The model subroutines return the calculated values of polymer properties in a reactor section back into the Data Acquisition System where loops are assigned in the Data Acquisition System for display 140 or to be kept in memory 150. The calculated results can be loaded down from the Data Acquisition System 110 through the FOXBORO computer interface 80 back into the memory 60 or directly into a controller card 70 in the UCM for further download into the control valves 160.

FIG. 3 presents the flowchart explaining the logical software calculation steps in the execution of the model subroutine. After the time schedule 120 has called the wake-up subroutine from hibernation FC1, the model subroutine obtains the input parameters FC2 (pressure, temperature and flow of monomers) in a given reactor section and checks for non-zero values of input parameters FC3. If there are indeed zero values, an alarm FC4 is displayed and the subroutine goes back to FC2 and stops calculations. If the input parameters are fine, then an average temperature, pressure drop and residence time in the reactor section are calculated FC5. The procedure continues on to determine the mixing times required in the fractional incorporation of a side stream of monomer "A" into the main bulk of fluid FC6.

$$F = 1. - EXP(a1*(Tr)**b1) \quad (2)$$

where a1 = F(% incorporation of monomer "A")
b1 = F(a1, flow rate)
Tr = residence time from inlet to section in reactor The solvent viscosity in the reactor FC7 is determined by means of the following equation:

$$Usol = c1*exp(d1/(e1+t), \quad (3)$$

where c1 = constant dependent on solvent type
d1 = temperature dependent constant
e1 = temperature dependent constant
t = average temperature in reactor section The solution viscosity in the reactor can be calculated from fundamental principles of Non-Newtonian fluid mechanics FC8. The key determination lies in a good prediction of the shear stress for flow inside a pipe reactor which can contain or not a shearing causing device like an agitator. This invention will cover either since the modification to the shear stress equation can be readily accomplished. The fundamental relationship for shear stress in a pipe is:

$$Trz = (\Delta P*D/4*L)*(r/R - (R/r)*\lambda**2) \quad (4)$$

where $\Delta P$ = pressure drop
L = length of reactor section
r = variable radius inside the flow field
R = reactor inside radius
$\lambda$ = constant of integration Since for Non-Newtonian fluids there are a number of models that relate the shear rate to the shear viscosity of the polymer, one can choose the one which is the most appropriate for the situation at hand. In this invention we chose the Power Law model for Non-Newtonian fluids, represented by $$Trz = (u/gc)*(\partial v/\partial r)**n \quad (5)$$

where u = shear viscosity
gc = gravitational conversion factor
$\partial v/\partial r$ = shear rate
n = pseudoplasticity index The solution viscosity is obtained by setting equation (5) equal to equation (4) and then solving for the unknown u. In some instances, the shear viscosity in equation (5) can be made a function of the type of agitator and the rotational speed of it. Also, the shear rate could be a function of the flow rate only, such as flow inside a pipe without an agitator.

The specific viscosity is then calculated by using the well-known definition in polymer chemistry according to FC9:

$$Us = (u/Usol) \quad (6)$$

The calculation of polymer fraction in solution from monomers' flow rates is performed in FC10. Then, the calculation of solution density FC11 from average temperature in a reactor section polymer fraction in solution is done. The equations herein mentioned will vary from one polymer system to another and are proprietary.

The following step is to calculate the polymer concentration in solution FC12 from solution density and polymer fraction in solution. The equation is:

$$C = 100 * W * RO \tag{7}$$

where C = polymer concentration in solution, g/dl
W = polymer fraction in solution, % by weight
RO = solution density, g/cc Calculation of the axial external stoichiometric ratio in every reactor section FC13 is accomplished from momomers' flows and the slow influx incorporation fraction. The external stoichiometric ratio is given as $$Re = sum(Fi\ monomer\ \text{``A''})/FB \tag{8}$$

where Fi = flow rate of monomer "A" injected in the i-th position along the reactor length
FB = flow rate of monomer "B" fed to reactor inlet The prediction of the intrinsic viscosity [n] FC15 from the specific viscosity and polymer concentration can proceed by a Newton-Raphson FC18 solution of the Martin equation:

$$Us = C*[n]*EXP(K'''*[n]*C) \tag{9}$$

After convergence is achieved FC17, the calculation of molecular weight weight average FC19 can be obtained from the Mark-Houwik equation:

$$Mw = (Us/a)**(1./b) \tag{10}$$

where a = constant dependent on polymer type
b = constant dependent on polymer type The calculation of molecular weight number average Mn FC20 is begun by first assuming an apparent stoichiometric ratio from the external stoichiometric ratio based on ingredient flows in every reactor section.

$$Ra = k*Re \tag{11}$$

where k < 1.0

The next step is to determine the first and second moments of the molecular weight distribution of the individual monomers FC21. If the monomers are pure (monodisperse), then the first and second moments of the molecular weight distribution of the monomers become equal to the actual molecular weight (based on summation of individual atomic weights of the atoms composing the molecule) of the monomer.

The calculation of the first and second moments of the molecular weight distribution of the reacting mixture FC22 in a reactor section is based on the apparent stoichiometric ratio and the first and second moments of the individual monomers. This calculation is performed by using the definition of the moments for a generalized polycondensation reaction:
first moment $$M1 = (maa(1) + r*mbb(1))/(1-r) \tag{12}$$

where maa(1) = first moment of individual monomer "A"
mbb(1) = first moment of individual monomer "B"
r = apparent stoichiometric ratio
second moment $$M2 = maa(2) + (r/(1-r))*[\{maa(1)\}**2 + \\ 4*maa(1)*mbb(1) + \{maa(1)\}2 + \{mbb(1)\}2] + \tag{13}$$

-continued $$[2*r*qe/(\{1-qe\}*\{1-r\})]*[maa(1) + mbb(1)]**2$$

where maa(2) = second moment of individual monomer "A"
mbb(2) = second moment of individual monomer "B"

qe = effective stoichiometric ratio = r/Re

At this point, the molecular weight weight average Mw is calculated as the ratio of the second moment to the first moment of the molecular weight distribution FC23 of the polymer. The equation is given as:

$$Mw = M2/M1 \tag{14}$$

If the value of Mw calculated by equation (14) is the same as that calculated in equation (10) above, then the solution converged FC24 and we have at hand the right values of the moments of the molecular weight distribution of the polymer. Therefore, the value of molecular weight number average FC27 of the polymer is given by the first moment of the molecular weight distribution as given in equation (12). If, on the other hand, convergence was not achieved, a Newton-Raphson solution algorithm guesses a new value of the apparent stoichiometric ratio FC25 and repeats the calculation sequence explained in this paragraph until convergence is achieved.

Determination of the polydispersity is, therefore, a straightforward calculation by using the converged values of the first and second moment of the molecular weight distribution FC28. The polydispersity of the molecular weight distribution of the polymer is then:

$$PF = M2/(M1)**2 \tag{15}$$

After final calculation of polydispersity, the model subroutine returns control to the scheduler FC29 subroutine and can either go back and do the same calculations for another reactor section or stop altogether and activate the hibernation subroutine FC30. Finally, the whole process will be repeated after the hibernation time limit is reached and then the model subroutine is called again and the calculation procedure is repeated all over.

EXAMPLE I

The continuous polymerization reactor system similar to that shown in FIG. 1A, except that five rather than three passes are used, is controlled by means of a closed loop system that senses the polymer viscosity at the exit of the fifth reactor pass and corrects the specified viscosity value by adjusting the flow of monomer "A" to the middle of the third pass.

According to the input data required by the on-line math model, inlet and outlet pressure, temperature, monomer flows and rpm of the agitator device in the fifth pass were used to calculate the actual molecular weight weight average of the polymer for a three day period. The calculated Mw results appear in FIG. 9 in addition to the bulk viscosity (curve A) measured by the on-line viscometer at the end of the fifth pass. The Mw is the average for the fifth pass as predicted by the model. It is worthwhile to notice that the general trend of the model Mw predictions follow the bulk viscosity because of their close relationship. A good example of this is the rightmost part of FIG. 9, just after a reactor start-up. However, in the short term, the model is predicting changes in Mw not shown by the bulk viscometer, hence suggesting perhaps that viscosity only might not be a suitable control variable. In certain systems, viscosity may remain essentially unchanged while the molecular weight number average Mn varies out of control.

EXAMPLE II

Figure 6:
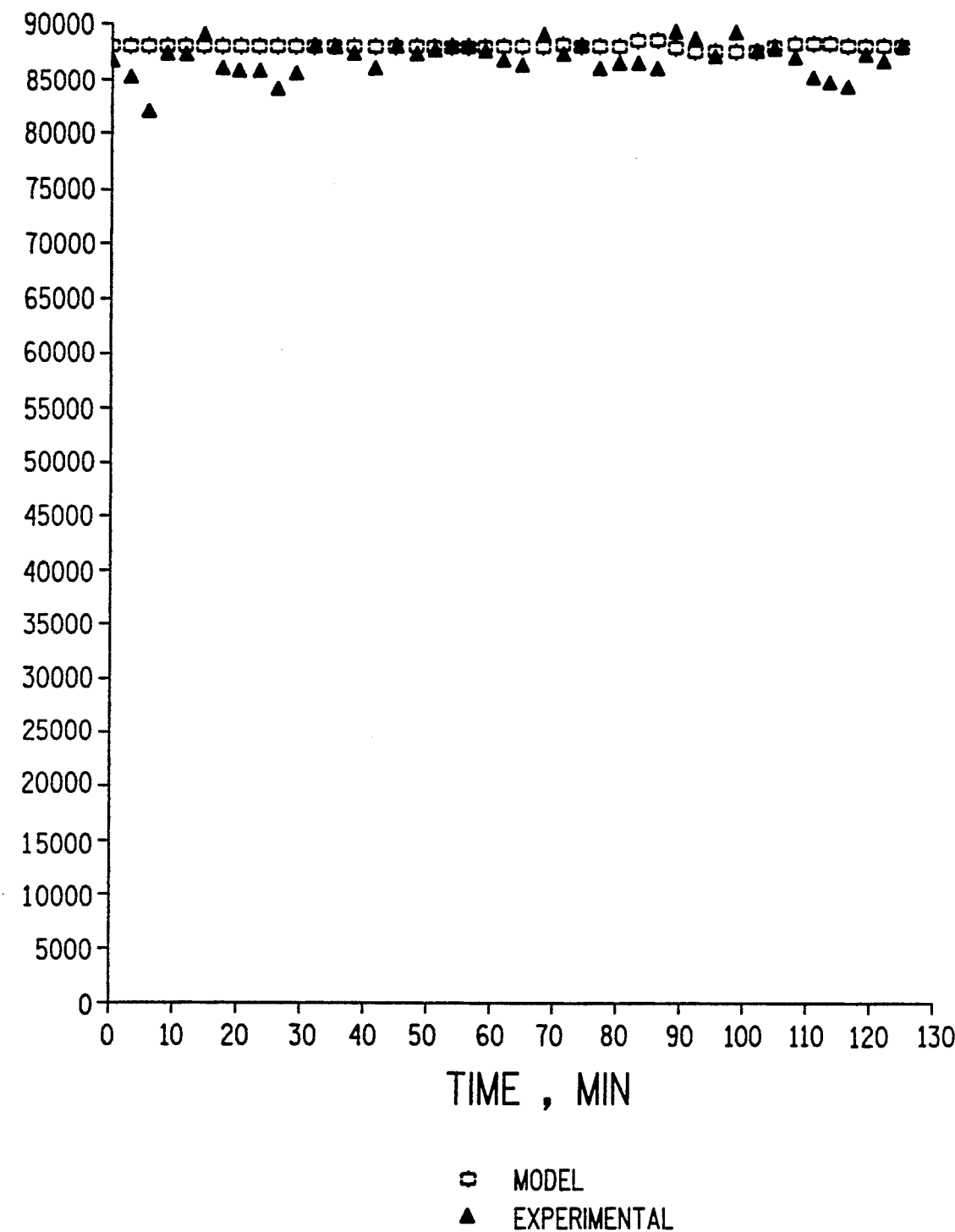
FIG. 6, 7 and 8 are graphs of comparing model prediction with experimental results obtained in Example II.
Figure 7:
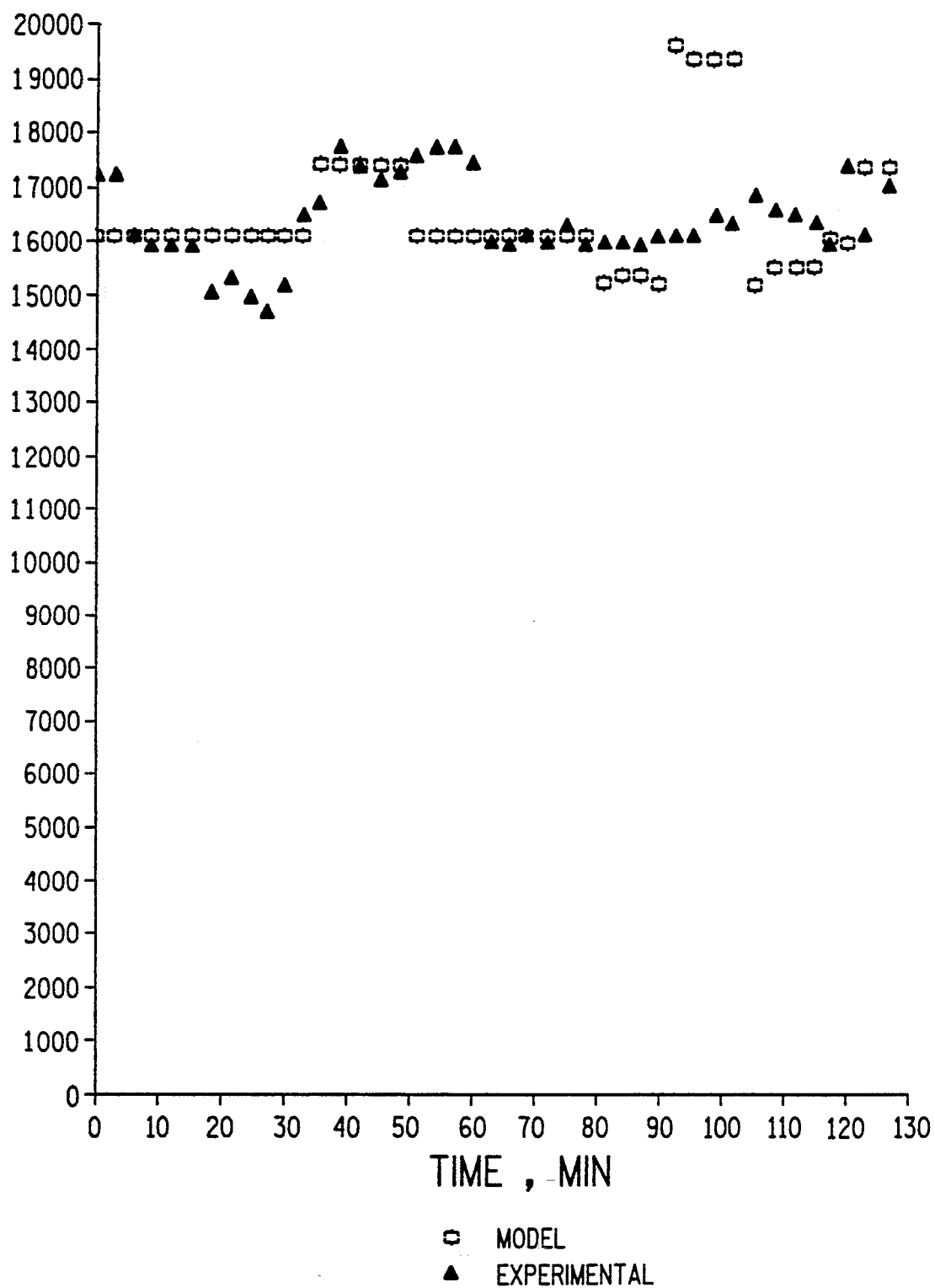
Figure 8:
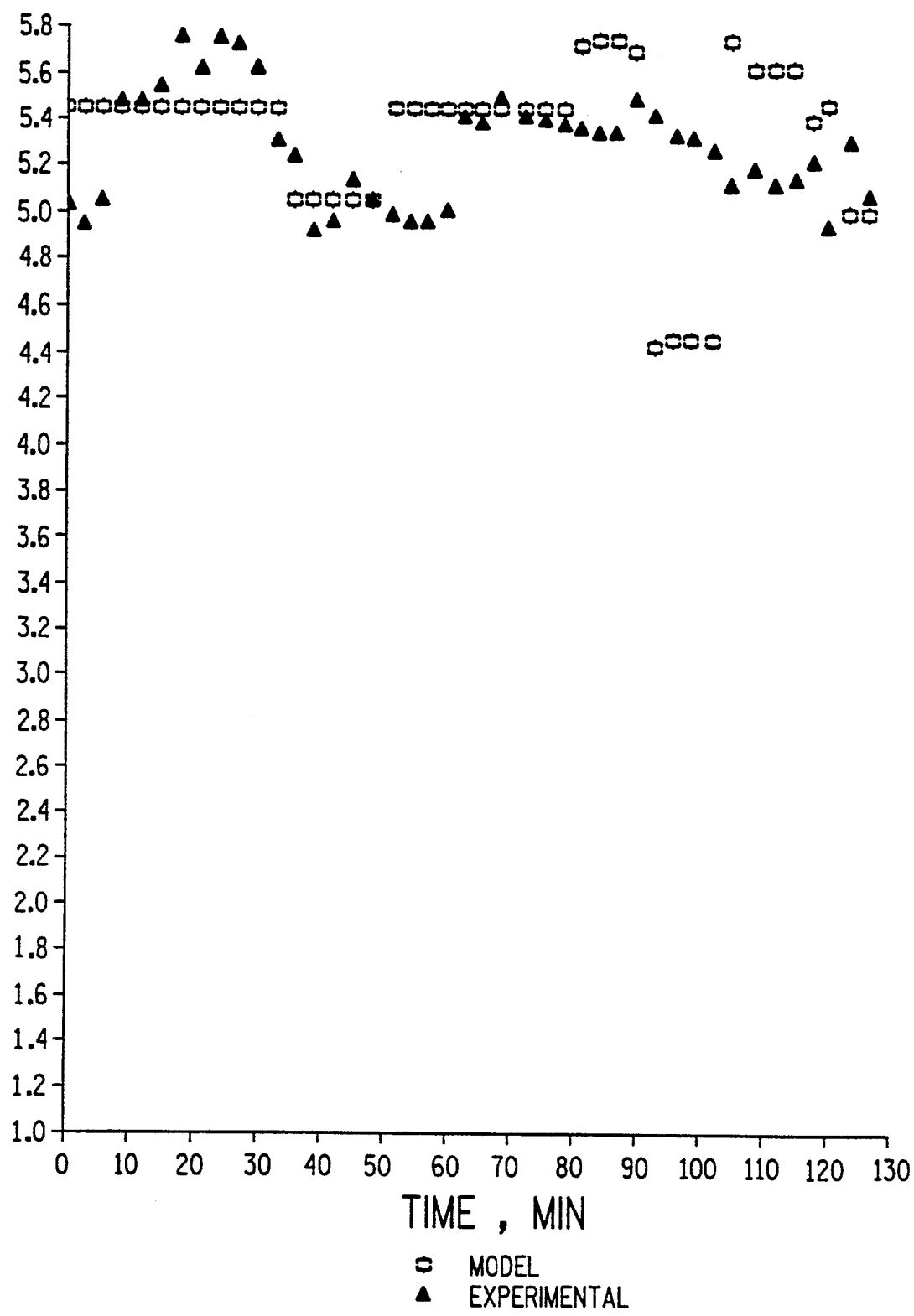
Figure 9:
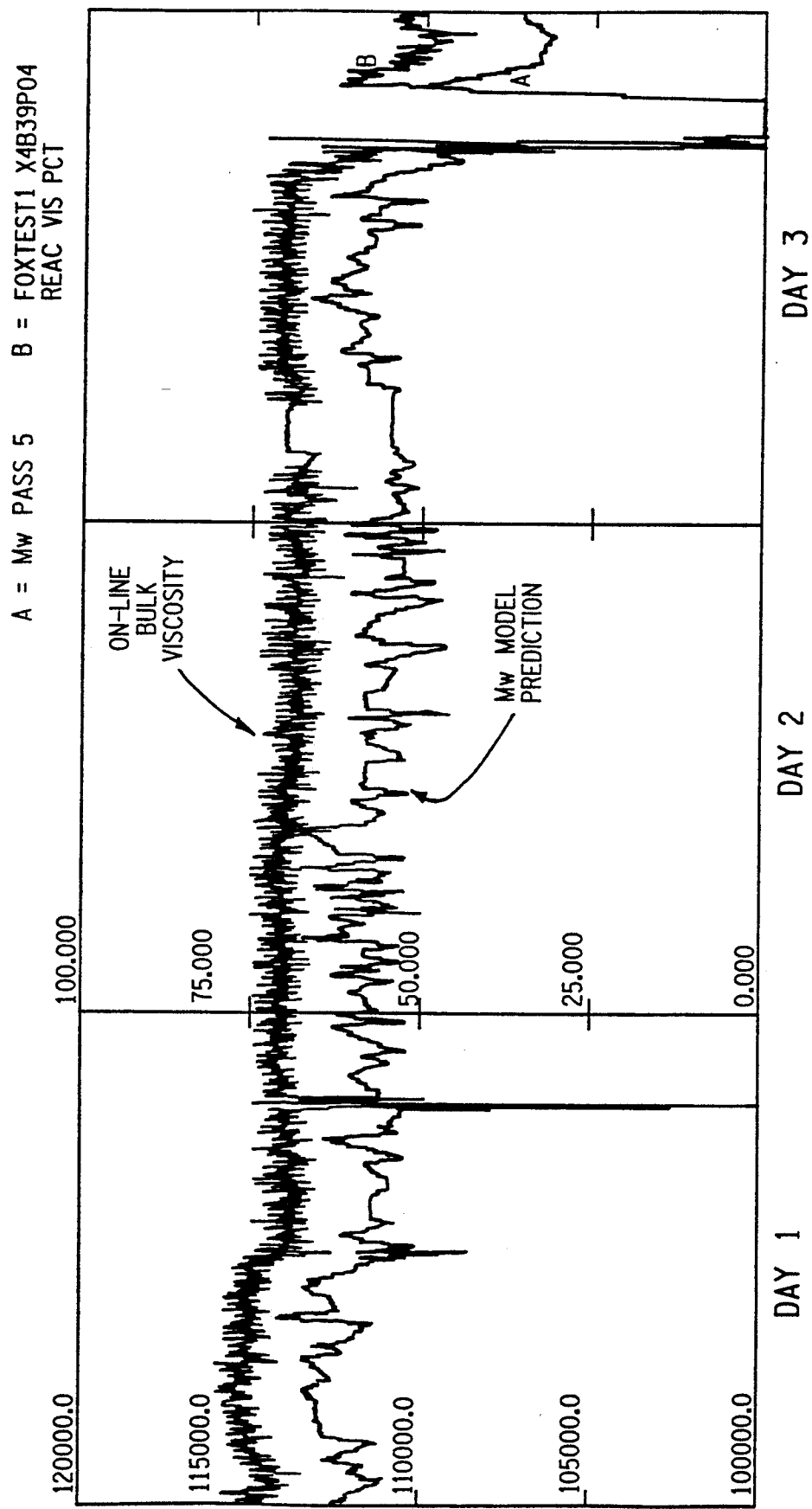
FIG. 9 is a graph comparing bulk viscosity with model prediction in Example I.

This example deals with the evaluation of the polymer made during a two hour period in the continuous polymerization reactor shown in FIG. 9. Off-line verification of model predictions by analyzing polymer samples taken from the exit of the fifth reactor pass was accomplished with a liquid chromatograph. Polymer samples were collected every three minutes, analyzed and compared to the on-line real time model predictions. FIGS. 6, 7 and 8 show the molecular weight weight average, molecular weight number average and polydispersity, respectively. Table 2 shows the individual values of the polymer properties as well as the percent error of the model predictions versus the measured values. The data suggests good agreement between model predictions and measured values. In some instances, the differences could be explained due to the fact that the sample port was located at the exit of the fifth reactor pass and the actual model predictions represent the average for the fifth pass. As proven herein, this method allows the on-line monitoring of product quality in the continuous reactor while avoiding time-consuming laboratory analysis. The calculated results can then be used to alert the operator of unusual reactor problems, to optimize reactor operation during shut-down and startup or rate changes as well as determine when to segregate product which is off-spec. Since all of the results are stored in the data acquisition system, this patent allows for the future correlation of product performance in downstream processes to the polymer characteristics.

TABLE 2

POLYMER PROPERTIES.ON-LINE MODEL PREDICTION VERSUS EXPERIMENTALLY MEASURED

| 1 SAMPLE NUMBER | 2 Mn MODEL | 3 Mn MEASURED | 4 % ERROR | 5 Mw MODEL | 6 Mw MEASURED | 7 % ERROR | 8 Mw/Mn MODEL | 9 Mw/Mn MEASURED | 10 % ERROR |
|---|---|---|---|---|---|---|---|---|---|
| 1 | 16169 | 17244 | −6.23 | 87967 | 86562 | 1.62 | 5.44 | 5.02 | −7.73 |
| 2 | 16169 | 17244 | −6.23 | 87967 | 85281 | 3.15 | 5.44 | 4.95 | −9.09 |
| 3 | 16222 | 16272 | −0.32 | 87967 | 82062 | 7.20 | 5.44 | 5.06 | −7.02 |
| 4 | 16169 | 16020 | 0.93 | 87967 | 87451 | 0.59 | 5.44 | 5.46 | 0.34 |
| 5 | 16169 | 16039 | 0.81 | 87967 | 87400 | 0.65 | 5.44 | 5.45 | 0.16 |
| 6 | 16169 | 16020 | 0.93 | 87967 | 88869 | −1.01 | 5.44 | 5.55 | 1.97 |
| 7 | 16169 | 15030 | 7.58 | 87967 | 86260 | 1.98 | 5.44 | 5.74 | 5.49 |
| 8 | 16169 | 15293 | 5.73 | 87967 | 85942 | 2.36 | 5.44 | 5.62 | 3.30 |
| 9 | 16169 | 14957 | 8.11 | 87967 | 85850 | 2.47 | 5.44 | 5.74 | 5.50 |
| 10 | 16169 | 14686 | 10.10 | 87967 | 83863 | 4.89 | 5.44 | 5.71 | 4.96 |
| 11 | 16169 | 15225 | 6.20 | 87967 | 85491 | 2.90 | 5.44 | 5.62 | 3.21 |
| 12 | 16169 | 16535 | −2.21 | 87967 | 87878 | 0.10 | 5.44 | 5.31 | −2.31 |
| 13 | 17371 | 16743 | 3.75 | 87776 | 87993 | −0.25 | 5.05 | 5.26 | 4.01 |
| 14 | 17371 | 17758 | −2.18 | 87776 | 87510 | 0.30 | 5.05 | 4.93 | −2.47 |
| 15 | 17371 | 17387 | −0.09 | 87776 | 86349 | 1.65 | 5.05 | 4.97 | −1.71 |
| 16 | 17371 | 17104 | 1.56 | 87776 | 88263 | −0.55 | 5.05 | 5.16 | 2.13 |
| 17 | 17371 | 17280 | 0.53 | 87776 | 87504 | 0.31 | 5.05 | 5.06 | 0.22 |
| 18 | 16169 | 17602 | −8.14 | 87967 | 87853 | 0.13 | 5.44 | 4.99 | −8.26 |
| 19 | 16169 | 17768 | −9.00 | 87967 | 88166 | −0.23 | 5.44 | 4.96 | −8.79 |
| 20 | 16169 | 17778 | −9.05 | 87967 | 88371 | −0.46 | 5.44 | 4.97 | −8.63 |
| 21 | 16169 | 17504 | −7.62 | 87967 | 87857 | 0.13 | 5.44 | 5.02 | −7.74 |
| 22 | 16169 | 16078 | 0.57 | 87967 | 87014 | 1.10 | 5.44 | 5.41 | −0.52 |
| 23 | 16169 | 16030 | 0.87 | 87967 | 86267 | 1.97 | 5.44 | 5.38 | −1.08 |
| 24 | 16169 | 16224 | −0.34 | 87967 | 89203 | −1.39 | 5.44 | 5.50 | 1.06 |
| 25 | 16175 | 16138 | 0.23 | 88042 | 87448 | 0.68 | 5.44 | 5.42 | −0.45 |
| 26 | 16154 | 16343 | −1.15 | 87744 | 88135 | −0.44 | 5.43 | 5.39 | −0.71 |
| 27 | 16154 | 16031 | 0.77 | 87744 | 85900 | 2.15 | 5.43 | 5.36 | −1.35 |
| 28 | 15368 | 16056 | −4.28 | 87886 | 86334 | 1.80 | 5.72 | 5.38 | −5.97 |
| 29 | 15405 | 16095 | −4.29 | 88479 | 86324 | 2.50 | 5.74 | 5.36 | −6.62 |
| 30 | 15405 | 16017 | −3.82 | 88479 | 85975 | 2.91 | 5.74 | 5.37 | −6.55 |
| 31 | 15345 | 16236 | −5.49 | 87509 | 88894 | −1.56 | 5.70 | 5.48 | −3.99 |
| 32 | 19625 | 16226 | 20.95 | 86875 | 88278 | −1.59 | 4.43 | 5.44 | 22.90 |
| 33 | 19461 | 16197 | 20.15 | 86857 | 86595 | 0.30 | 4.46 | 5.35 | 19.79 |
| 34 | 19461 | 16611 | 17.16 | 86857 | 88643 | −2.01 | 4.46 | 5.34 | 19.57 |
| 35 | 19461 | 16474 | 18.13 | 86857 | 86947 | −0.10 | 4.46 | 5.28 | 18.26 |
| 36 | 15245 | 17013 | −10.39 | 87490 | 87327 | 0.19 | 5.74 | 5.13 | −10.56 |
| 37 | 15578 | 16729 | −6.88 | 87809 | 86874 | 1.08 | 5.64 | 5.19 | −7.87 |
| 38 | 15578 | 16621 | −6.27 | 87809 | 85253 | 3.00 | 5.64 | 5.13 | −9.00 |
| 39 | 15578 | 16435 | −5.21 | 87809 | 84750 | 3.61 | 5.64 | 5.16 | −8.51 |
| 40 | 16197 | 16133 | 0.40 | 87664 | 84475 | 3.78 | 5.41 | 5.24 | −3.26 |
| 41 | 16073 | 17556 | −8.45 | 87686 | 87249 | 0.50 | 5.46 | 4.97 | −8.90 |

What is claimed is:

1. A method of predicting physical properties of a polymer formed from a plurality of monomers flowing in a path through a continuous polymerization reactor in an irreversible reaction process with the aid of a digital computer, said method comprising:

(a) obtaining a digital data set by sensing flow rates of the monomers, pressure and temperature of the polymer at a plurality of locations along said path all on a real time basis to provide an analog signal output and converting said analog signal output to a digital signal output;

(b) providing the computer with a data base that includes the digital data set obtained by step (a);

(c) programming the computer according to a Newton-Raphson algorithm;
(d) calculating the physical property of the polymer based on non-Newtonian fluid mechanics according to the algorithm of step (c) using the data base of step (b);
(e) displaying said property as a display element whereby a predicted physical property of the polymer is obtained based on non-Newtonian fluid mechanics.

2. The method of claim 1 wherein said physical property is molecular weight.

* * * * *